May 2, 1950 C. W. DALZELL 2,506,070
INSULATED THERMOSTATIC SWITCH
Filed Oct. 23, 1946 2 Sheets-Sheet 1
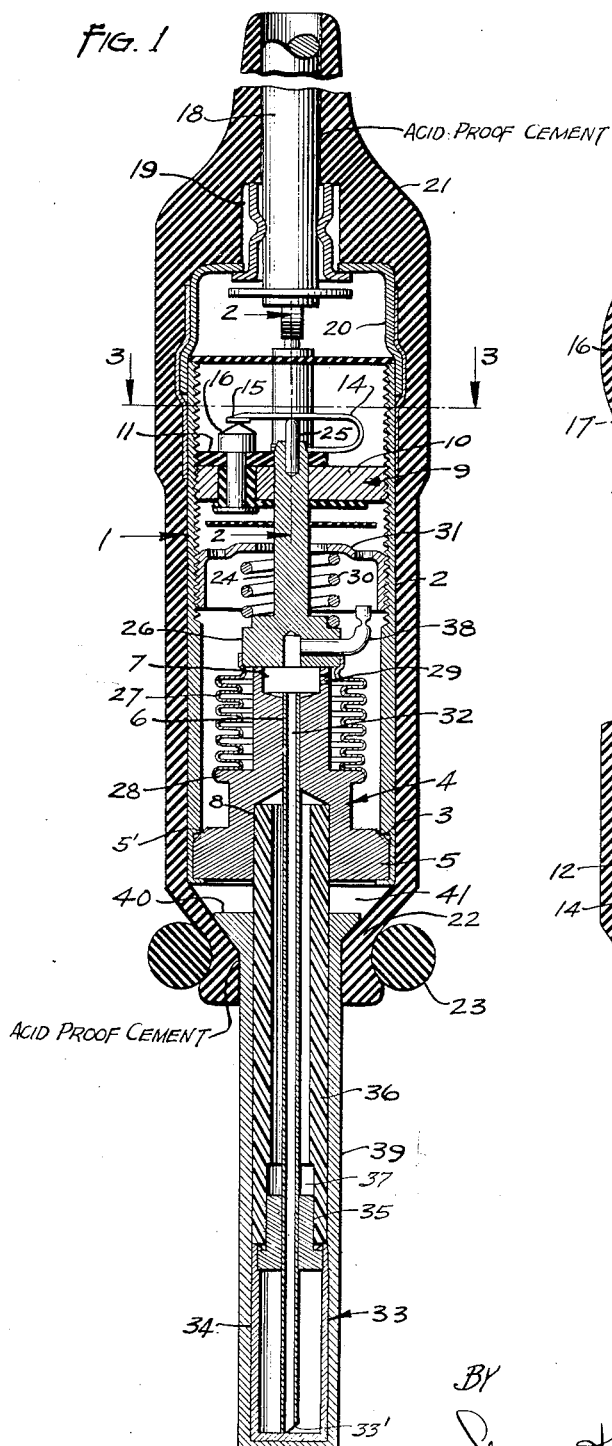
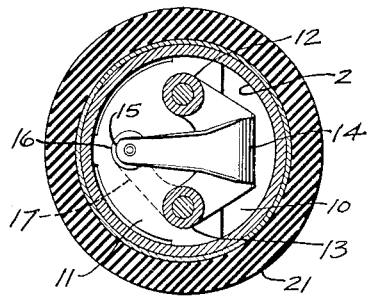
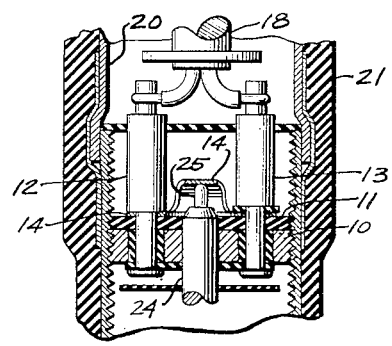
INVENTOR
CLARENCE W. DALZELL
BY
Semmes, Keegin, Robinson and Semmes
ATTORNEYS

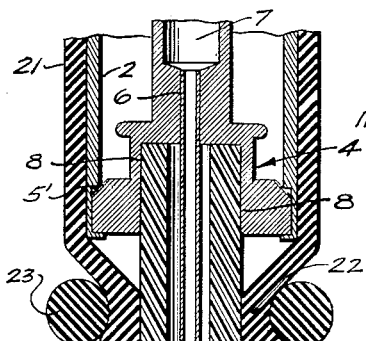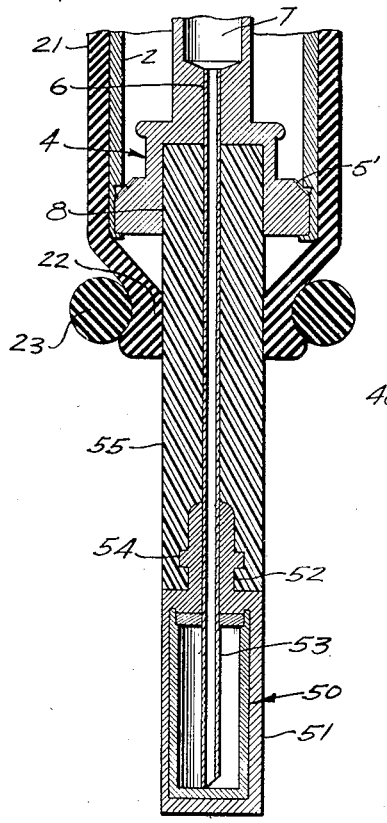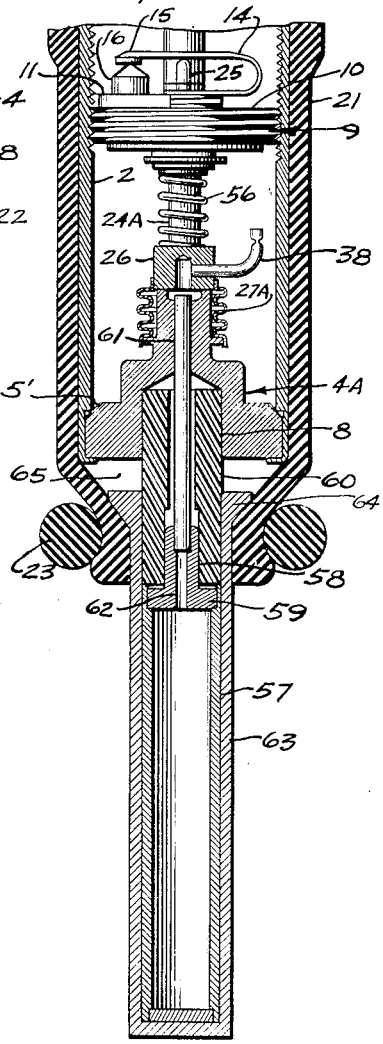

Patented May 2, 1950

2,506,070

UNITED STATES PATENT OFFICE 2,506,070

INSULATED THERMOSTATIC SWITCH

Clarence W. Dalzell, West Caldwell, N. J., assignor to Heyer Industries Incorporated, Belleville, N. J., a corporation of Delaware Application October 23, 1946, Serial No. 705,138

10 Claims. (Cl. 200—140)

This invention relates to thermostats and more particularly to thermostatically actuated switches of the type employed in the charging of storage batteries.

In the use of so-called fast chargers, where high charging currents are passed through the battery, it is essential not to over-heat the battery to prevent damage thereto, but it is also important that the battery be charged as much as possible up to the temperature limit above which damage would result. This temperature is usually determined by that of the electrolyte of the battery, a thermostatically actuated switch responsive to the electrolyte temperature being employed to shut off the charger or give a warning to the operator or both when maximum safe temperature is reached.

One type of such a thermostatic switch is described in Patent No. 2,376,056, issued May 15, 1945, to Benjamin F. W. Heyer, and comprises essentially an electric switch actuated by a bellows forming a part of an expansion system containing an expansible fluid and which includes a bulb communicating with the bellows. The switch and bellows are enclosed in and supported by a casing having an extension tip which contains the bulb. In use, the extension tip is inserted through one of the filling caps into the electrolyte of the battery being charged and, when the thermostatic fluid has expanded to a predetermined point due to rise in the electrolyte temperature, the switch is opened.

It has been found that the action of this type thermostat is materially affected by the temperature of the ambient atmosphere, particularly when the ambient temperature is cold, as a considerable amount of heat is conducted from the immersed tip to the exposed case which leads to inaccuracies in the operating temperature at which the switch trips with respect to the actual temperature of the electrolyte. In other words, the colder the exposed part of the case, the higher the electrolyte temperature must rise before there is enough bellows movement to actuate the switch, which could result in a damaged battery. Conversely, the warmer the exposed part of the case, the lower the temperature of the electrolyte would be when the switch would be actuated, which usually would result in an incompletely charged battery.

It is therefore one of the principal objects of this invention to provide a thermostat of the above type on which the effect of the temperature of the ambient atmosphere is greatly reduced.

Another object of this invention is to provide a thermostatic switch of the above type in which the temperature sensitive bulb inserted in the electrolyte is thermally insulated from the major portion of the case which is exposed to the air.

A more specific object of this invention is to provide a thermostat of the above character in which the temperature sensitive bulb and capillary tube connecting the same with the switch actuating bellows are rigidly supported by an extension of a material of low heat conductivity which connects the bulb with the exposed case containing the bellows and switch assembly.

With these and other important objects and advantages in view, which will become more apparent during the course of the following description, the invention resides in the parts and combinations hereinafter set forth with the understanding that various changes may be made therein such as in shape, size and arrangement of the parts without departing from the spirit of the invention.

In order to make the invention more clearly understood several embodiments thereof are illustrated in the accompanying drawings in which:

Figure 1 is a transverse sectional view of a thermostatic switch of the so-called liquid-vapor type constructed in accordance with this invention.

Figure 2 is a fragmental transverse sectional view taken on the line 2—2 of Figure 1.

Figure 3 is a cross sectional view taken on the line 3—3 of Figure 2.

Figure 4 is a fragmental transverse sectional view of a modified arrangement of bulb and insulating extension for a thermostatic switch such as shown in Figure 1.

Figure 5 is a view similar to Figure 4 but illustrating a slightly different means of connection of the bulb to the supporting and insulating extension.

Figure 6 is a vertical transverse sectional view of a liquid expansion type thermostatic switch according to this invention.

In the embodiment of the invention shown in Figures 1 to 3 the thermostatic switch comprises a case 1 in the form of a cylindrical metallic shell 2 internally screw threaded in its upper portion and internally bored out at its lower end to form a shoulder 3. A bottom element in the form of a cylindrical block 4 having a bottom flange 5 is axially positioned in the lower end of the shell 2 with the upper edge of the flange 5 seated on the shoulder 3 and the lower rim of the shell tightly spun over the lower end of the flange. The block extends upwardly into the shell 2 and is provided with an axial bore 6 enlarged at its upper end to form a recess 7 and at its lower end to form a socket 8.

Positioned in the upper portion of the case 1 is a switch assembly designated generally as 9 and comprising a metal disc 10 peripherally screw threaded and screwed into the threaded end of the shell 2. The disc 10 preferably has secured thereto a fiber disc 11 peripheral portions of which have a tight frictional engagement with the threaded surface of the tube 2 to prevent accidental displacement of the switch assembly after positioning in the case.

As seen in Figure 2, the disc 10 has secured therein, but insulated therefrom, a pair of connector posts 12 and 13 which pass through the disc 10. Held to the top of the disc 10, preferably by the posts 12 and 13, is one end of a resilient conductor strip 14 which has an electrical connection with the post 12 but is insulated from the other post 13. The free end of the strip 14 carries a contactor point 15 which normally engages a fixed contact point 16 carried by the disc 10, insulated therefrom and connected with the post 13 by means of a connector 17, as best seen in Figure 3. Attached to the posts 12 and 13 respectively are wires of a two wire rubber covered cable 18 by means of which the switch may be connected into a control circuit adapted to be actuated by the thermostat. For example, the thermostat may comprise part of a battery charging circuit, the switch being so connected as to cut off the charging current when the temperature of the battery electrolyte has reached a predetermined temperature as will be explained further hereinafter.

The end of the rubber covering of the cable 18 has crimped thereabout a flanged, strain relieving bushing 19 which passes through a central aperture in a cap 20 fitted over the upper end of the casing shell 2. The whole case 1 is enclosed in a rubber covering 21 which, at its upper end, surrounds and is cemented to the cable 18 by a suitable acid proof cement. The lower end of the covering 21 tapers inwardly to a reduced neck 22 about which may be positioned a soft rubber clamping ring 23.

Adapted to move the movable contact point 15 out of engagement with the fixed contact point 16 is a vertically movable plunger 24 which moves through a central aperture in the disc 10. The upper end of the plunger 24 is fitted with a tip 25 of insulating material which engages the contactor strip 14. The lower end of the plunger 24 is formed with a radial flange 26 to the lower edge of which is soldered the upper end of a metal bellows element 27 while the lower end of the bellows is soldered to a peripheral bead 28 formed on the block 4 below the upper end thereof. As seen in Figure 1, the wall of the bellows 27 is spaced radially from the upper portion of the block 4 and the interior of the bellows communicates with the recess 7 through one or more radial apertures 29 in the cylindrical wall of the recess.

As seen in Figure 1, the lower face of the plunger 24 normally rests on the upper face of the block 4, in the collapsed condition of the bellows 27, the plunger 24 being urged toward the block 4 by means of a compression spring 30, the lower end of which rests on a seat or shoulder on the plunger flange 26. The upper end of the spring 30 is seated in an inverted cup shaped nut 31, screw threaded in the threaded portion of the shell 2 below the switch assembly 9.

Communicating with the recess 6 is one end of a capillary tube 32 which is soldered in the central bore 6 of the block 4. The opposite end of the tube 32 communicates with the interior of a bulb 33 formed of a thin metal shell 34 of copper or other rigid, high heat conductive metal and provided with a closure member 35. The closure member 35 is preferably in the form of a cylindrical plug provided with an end flange about which the rim of the shell 34 is spun and soldered. As seen in Figure 1, the plug projects above the rim of the shell 34 and the tube 32 passes therethrough to touch the bottom wall of the bulb, having a pressure-tight connection, such as by soldering, with the plug. The lower end of the tube is cut on an angle as indicated at 33' so that liquid is free to flow into and out of the lower end of the tube to and from the bulb 33.

Since thermostats of this character are subject to rather rough usage, it is important that the thermostat be constructed as a rugged unit and, particularly, that the bulb be rigidly connected with the remainder of the thermostat, preferably supported by the case 1. Also, according to the principles of this invention, since both the bulb and the case are composed of materials having relatively high heat conductivity, the bulb is substantially insulated thermally from the case to reduce heat loss from the bulb. To accomplish this, a tube 36, composed of a material of low thermal conductivity, such as Bakelite or other suitable rigid plastic is positioned between the block 4 and the bulb 33 surrounding the capillary tube 32, the upper end of the tube 36 being press-fitted into the socket 8 in the block 4 and the projection of the plug 35 being press-fitted into a counter bore 37 in the lower end of the tube.

The connecting tube 36, because of its low heat conducting property, not only substantially insulates the bulb thermally from the main portion of the thermostat and reduces the amount of heat normally lost from the bulb through conduction to the rest of the structure, but also effectively insulates the capillary tube 32 to effect a further reduction in heat loss. In addition the rigid tube 36 provides a protective sheath preventing damage to the small capillary tube.

The thermostat shown in Figure 1 is of the so-called liquid-vapor type, depending for its motion on an expanding gas. A low boiling point liquid, such as Freon 11 (trichloromonofluoromethane) which boils at 74° F., is introduced through a filling tube 38 to fill the bulb and bellows. After filling, the tube 38 is closed and sealed. When the liquid is heated above its boiling point, as will be the case when the bulb end of the thermostat is immersed in the electrolyte of a battery undergoing a fast charge, the vapor will exert a pressure on the surface of the fluid in the bulb 33, the pressure being transmitted through the fluid to expand the bellows against the compression force of the spring 30. Expansion of the bellows will move the plunger 24 upwardly to break contact between the switch points 15 and 16 when the tip 25 engages the strip 14.

The threaded spring seat 31 provides for adjustment of the compressive force of the spring 30. The adjustment of the force of the spring 30 against the flange 26 at the movable end of the bellows is for the purpose of regulating the temperature at which movement of the plunger 24 shall take place. This adjustment is made in assembling the thermostat, according to the kind of fluid used in the expansion system, so that movement of the plunger will start at 90–100° F.

As stated above, the bulb shell 33 is preferably made of copper and, since the bulb is immersed in the battery acid, it is protected from corrosion by means of a lead sheath. According to the embodiment shown in Figure 1 this sheath, which is designated as 39, is formed with substantially thin cylindrical and bottom walls and of a size to provide a close surface contact with the bulb 33 inserted therein. The sheath 39 extends over the connecting tube 36 with its upper end inserted in the neck 22 of the rubber covering 21 which fits tightly therearound and is preferably cemented thereto by a suitable acid proof cement. The rim of the lead sheath 39 is flared outwardly into a flange 40 which fits within the inwardly tapered end of the rubber covering 21 and holds the sheath on the bulb extension. As will be noted in Figure 1, the upper end of the lead sheath is spaced from the block 4 to provide an air space 41 between the sheath and block which effectively isolates the sheath from the exposed upper metal structure of the thermostat and serves to reduce loss of heat from the bulb which would otherwise be conducted through the lead sheath to the exposed upper structure. It is desirable to prevent relative rotation between the bulb 33 and the remainder of the structure. This may be accomplished conveniently by thoroughly sweating the plug 35 into the open end of the bulb 33, externally knurling the neck of the plug 35 and internally knurling the socket 8 in the block 5 and pressing the tube 36 over these knurled surfaces. In addition, the beveled rim of the flange 5 may be knurled as indicated at 5' to prevent relative rotation of the block 4 and shell 2 after the shell is spun over the flange as described. The outer surface of the bulb 33 may also be knurled and pressed into the lead sheath 39.

A thermostat extension tip which may omit a continuous lead protecting sheath, such as the sheath 39, is shown in Figure 4. Here the bulb 42, made of copper or other relatively high heat conductive metal, comprises a cylindrical shell 43 having an integral bottom and a top closure disc 44 seated on an internal shoulder in the rim of the shell. A capillary tube 45 passes through the top closure to adjacent the bottom of the bulb to connect the bulb with the bellows as in the case above. The bulb and lower protruding portion of the capillary tube have cast therearound a sheath 46 preferably of a lead-antimony alloy which fuses into intimate contact with the bulb. This sheath forms a protective covering 47 around the bulb and is cast to provide a neck 48 which surrounds the lower portion of the capillary tube. The neck portion 48 is externally screw threaded and screwed into a correspondingly threaded end of the axial bore at the lower end of a connecting and supporting tube 49 the upper end of which is press-fitted into the socket 8 of the casing bottom block 4 as in the case above. The tube 49 in this embodiment is composed of a rigid, acid resistant plastic material, such as polystyrene, either machined or cast with the axial bore thereof of sufficient diameter to accommodate the capillary tube passing therethrough without the capillary tube contacting the wall of the bore. By casting the sheath 46, a substantially molecular contact is obtained between the outer protective sheath and the bulb to provide a maximum of heat transfer from the battery electrolyte to the fluid in the bulb.

The form of tip extension shown in Figure 5 is very similar to that described and is likewise designed to omit the continuous lead protective sheath. Here, instead of screw threading the sheathed bulb into the supporting tube, a bulb 50, similar to the bulb 42, has cast around it a lead-antimony sheath 51 formed with a neck portion 52 around the lower part of the capillary tube 53. The neck 52 is cast with peripheral anchor means preferably in the form of a bead 54. Cast around the neck 52 and the capillary tube 53, except for the upper portion of the tube which is inserted in the bore 6 of the block 4, is a plastic tube 55 of polystyrene or other suitable acid resistant, moldable material which forms around the bead 54 to securely connect the sheathed bulb thereto. The upper end of the tube 55 is pressed into the socket 8 of the block 4, the upper end of the capillary tube passing through the bore 6 into the recess 7 where it is soldered to the block.

The foregoing thermostats are designed for gas pressure operation. However, the principles of this invention are equally adaptable for battery charging thermostats of liquid expansion type such as disclosed in the above mentioned Patent 2,376,056. Such a thermostat embodying the heat insulating features of this invention is shown in Figure 6.

In the embodiment shown in Figure 6, the case, rubber covering and switch assembly of the unit are essentially the same as described above and bear the same reference numerals. In the liquid expansion type of thermostat where operation of the switch is solely by expansion of a non-compressible liquid, it is important that air pockets or the slightest cushioning be eliminated in the bellows. For this reason the bellows spring, indicated as 56, should possess a substantially heavy loading force on the bellows. In other words, with the expansion system (bulb bellows and connecting tube) full and at a relatively low temperature with respect to the trip point of the switch, the spring 56 should compress the bellows tightly against the non-compressible column of liquid in the system. In this state, the bellows and plunger 24A will respond immediately to any temperature changes in the liquid whereas, if the spring 56 were not heavy enough to take up all "slack" in the expansion system, the liquid would have to expand considerably before motion of the plunger would take place. Conveniently, the spring may be positioned, in this case between the lower face of the switch assembly 9 and the upper face of the flange 26 of the plunger 24A.

In a liquid expansion thermostat it is preferable to have a bulb of comparatively large capacity and the operating bellows of small capacity relatively thereto. Such structure is shown in Figure 6 where the bellows element 27A closely surrounds the upper extension of the block 4A which may also be made smaller than the block 4 in the preceding liquid-vapor types. The bulb, which is designated as 57, is considerably longer than those of the liquid-vapor thermostats and may extend substantially to the lower extremity of the rubber covering 21 where the neck portion 58 of its plug closure 59 is press-fitted into the lower end of a short connector tube 60 the upper end of which is press-fitted into the socket 8 of the block 4. The tube 60, like those above, is composed of a suitable material of low thermal conductivity to reduce heat transfer from the bulb to the upper exposed mass of the unit. A capillary tube 61 passes through the connector tube 60 and connects the bulb with the bellows. In this case, the capillary tube need not extend to the bottom of the bulb but may connect at its lower end with an axial passage 62 in the closure plug 59. A protective lead sheath 63 similar to the sheath 39 surrounds the bulb and is provided with a flanged rim 64 which is inserted in the lower end of the rubber sheath 21. As in the case of the sheath 21, the upper end of the sheath 63 spaced from the block 4 to provide an insulating air space 65 between the sheath and case.

The thermostat shown in Figure 6 may be calibrated by adjusting the switch assembly 9 relatively with respect to the tip 25 of the plunger 24A. Thus when the liquid filling the bulb and bellows is heated to the temperature for which the thermostat has been calibrated, its expansion moves the plunger upwardly into engagement with the conductor strip 14, which separates the switch points 15 and 16 and opens the switch.

In the use of each of the above thermostats, the bulb extension or tip of the thermostat is inserted through one of the filling caps of the battery to be charged resting on the upper edges of the battery plates. The level of the electrolyte in the battery is regulated, preferably, so as to provide approximately five sixteenths of an inch immersion of the bulb end. As the charging progresses, the temperature of the electrolyte increases expanding the heat sensitive fluid whose pressure expands the bellows and moves the switch actuating plunger in the direction to open the switch. As the maximum safe electrolyte temperature is approached, which, as stated above may be 125° F., the plunger opens the switch which, if so connected in the charging circuit, will cut off the charging current.

Because of the construction described above, a substantial reduction in the amount of heat loss through conduction from the immersed bulb to the major mass of the thermostat lying in the ambient atmosphere is obtained. As a consequence, the relative temperature of the ambient air has a very reduced effect upon the operation of the thermostat. In other words, the switches of the present thermostats will open at more nearly the electrolyte temperature for which the thermostats have been calibrated, regardless of ambient temperature differentials, than similar instruments heretofore proposed and thereby result in safer operations of fast chargers.

I claim:

1. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, a tubular support member composed of low heat conductive rigid material joining the bulb to said metallic case and surrounding said capillary tube, and acid resistant metallic sheath means surrounding the bulb and separated from the case to provide a low heat conductive air gap between the sheath and case.

2. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, a tubular support member composed of low heat conductive rigid material joining the bulb to said metallic case and surrounding said capillary tube, acid resistant metallic sheath means surrounding said bulb and tubular support member, said sheath means being separated from the metallic case.

3. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, a tubular support member composed of low heat conductive rigid material joining the bulb to said metallic case and surrounding said capillary tube, a rubber covering enclosing said case, acid resistant metallic sheath means surrounding said bulb and tubular support member and having a connection with the rubber covering, said sheath means being separated by an air gap from the metallic case.

4. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, an acid resistant metallic sheath enclosing said bulb, and an acid resistant tubular support member composed of low heat conductive rigid material joining said sheath to the case and surrounding the capillary tube.

5. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, an acid resistant metallic sheath enclosing said bulb and having an intimate contact therewith, and an acid resistant tubular support member composed of low heat conductive rigid material joining said sheath to the case and surrounding the capillary tube.

6. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, an acid resistant metallic sheath enclosing said bulb and having an intimate contact therewith, said sheath having a neck portion surrounding that portion of the capillary tube immediately adjacent the bulb, an acid resistant tubular support member composed of a low heat conductive rigid material surrounding the capillary tube and having one of its ends joined to said case, and means cooperating between said neck portion of the sheath and the opposite end of said tubular support member joining the same to said sheath.

7. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, an acid resistant metallic sheath enclosing said bulb and having an intimate contact therewith, said sheath having an externally screw threaded neck portion surrounding that portion of the capillary tube immediately adjacent the bulb, and an acid resistant tubular support member composed of a low heat conductive rigid material having a screw threaded engagement at one end thereof with said neck portion and a jointure at the opposite end thereof with said case and surrounding said capillary tube.

8. A thermostat for use in the charging of storage batteries comprising a metallic bulb containing an expansible fluid and adapted to be inserted in the electrolyte of the battery, a switch, means including a bellows for actuating the switch, capillary tube means connecting the bellows with the bulb, a metallic case supporting the bellows and switch, said case adapted to lie in the atmosphere outside the battery, an acid resistant metallic sheath enclosing said bulb and having an intimate contact therewith, said sheath having a neck portion surrounding the portion of the capillary tube immediately adjacent the bulb, anchor means formed on the neck, supporting means composed of a moldable material of low heat conductivity formed about said neck anchor means and capillary tube and having a jointure with said case.

9. A thermostat of the liquid expansion type for use in the charging of storage batteries comprising a switch, means including a bellows for actuating the switch, a case supporting and enclosing the switch and bellows, an elongated cylindrical metallic bulb communicating with the bellows, heat insulating means joining the bulb to the case and a metallic acid resistant sheath surrounding the bulb and spaced from said case to provide a low heat conducting air gap between said sheath and case.

10. A battery charging control thermostat comprising a casing, an electric switch mounted in said casing, means including a bellows in said casing for actuating said switch, a rigid tubular stem of material of low heat conductivity projecting from the lower end of said casing, a bulb of material of high heat conductivity carried by the lower portion of said stem and containing an expansible fluid, capillary tube means connecting said bulb and bellows, said stem and bulb being of dimensions sufficient to enter the filler-vent opening of an electric storage battery, and a heat conducting acid resisting sheath covering the bulb and stem and spaced at its upper end from the casing to reduce the flow of heat between the sheath and casing.

CLARENCE W. DALZELL.

REFERENCES CITED

The following references are of record in the file of this patent:

UNITED STATES PATENTS

| Number | Name | Date |
| --- | --- | --- |
| 1,751,688 | Eggleston | Mar. 25, 1930 |
| 2,376,056 | Heyer | May 15, 1945 |